United States Patent [19]

Schlegel et al.

[11] 4,387,886
[45] Jun. 14, 1983

[54] VISE WITH ROTATABLE AND VERTICAL ADJUSTMENT

[75] Inventors: Wolfgang Schlegel, Oehringen; Arthur Wilke, Bad-Friedrichshall-Jagstfeld; Rolf Birkert, Pfedelbach, all of Fed. Rep. of Germany

[73] Assignee: Schlegel GmbH, Oehringen, Fed. Rep. of Germany

[21] Appl. No.: 290,950

[22] Filed: Aug. 7, 1981

[30] Foreign Application Priority Data

May 2, 1981 [DE] Fed. Rep. of Germany ... 8113061[U]

[51] Int. Cl.³ .......................... F16F 9/02; B23Q 1/04
[52] U.S. Cl. .............................. 269/71; 269/78; 269/310; 269/329; 248/631; 248/571; 248/583
[58] Field of Search ............... 269/310, 77, 78, 71, 269/329; 267/6.11, 182; 248/631, 157, 571, 583, 161; 403/290, 104, 373; 297/344, 307, 308, 309

[56] References Cited

U.S. PATENT DOCUMENTS

| 2,188,433 | 1/1940 | Friese | 269/71 |
| 2,763,053 | 9/1956 | Anderson | 269/78 |
| 3,788,587 | 1/1974 | Stemmler | 248/631 |
| 4,045,008 | 8/1977 | Bauer | 267/64.11 |

FOREIGN PATENT DOCUMENTS

| 63516 | 9/1891 | Fed. Rep. of Germany | 403/290 |
| 13249 | 12/1896 | Switzerland | 269/78 |

*Primary Examiner*—Robert C. Watson
*Attorney, Agent, or Firm*—Daniel H. Kane, Jr.

[57] ABSTRACT

A vise with conventional fixed and moveable jaws, a cylindrical support secured to the lower side of the fixed jaw, a mounting for attaching the vise to a bench or the like, a tube accommodating the cylindrical support for sliding and rotational movement, and a clamping arrangement on the mounting for clamping the tube and cylindrical support in place, is also provided with a gas spring within the tube. One end of the gas spring abuts the cylindrical support at its axial center while the other end abuts the sidewall of the tube exerting an upwardly directed force at an inclined angle which counteracts and offsets the tilting moment caused by the cantilevered jaws. The tube is formed with a portion of decreased diameter engaging the cylindrical support in the clamping zone, minimizing contact and friction, and preventing sticking or canting. The ends of the gas spring are coupled to the tube and support respectively by ball joints to permit free rotation while preserving the inclined angle and direction of the upward force.

7 Claims, 5 Drawing Figures

VISE WITH ROTATABLE AND VERTICAL ADJUSTMENT

BACKGROUND OF THE INVENTION

This invention relates to a novel vise with rotatable and vertical adjustment which has for its primary object the provision of means for facilitating the vertical adjustment by decreasing the friction to a minimum. A further object of the invention resides in the provision of a vise having a gas spring of the type shown e.g. in U.S. Pat. Nos. 3,595,552; 4,045,008; or 4,156,523; which counterbalances the weight of the vertically movable parts of the vise at least partially, said gas spring comprising a piston-and-cylinder unit the longitudinal axis of which being inclined with respect to the vertical in such way that the tilting momentum exerted by the cantilever parts of the vise and the workpiece is counteracted by the gas spring. Further objects and advantages will become apparent from the following description of a preferred embodiment of the invention with some variations and modifications.

SUMMARY OF THE INVENTION

The above and other beneficial objects and advantages are attained in accordance with the present invention by providing a vise which has the conventional fixed jaw and moveable jaw, a cylindrical support secured to the lower side of the fixed jaw, a mounting for attaching the vise to a bench or the like, a tube accommodating the cylindrical support for sliding and rotational movement, a clamping means on the mounting for clamping the tube and the support in place and a gas spring within the tube which abuts on one hand on the tube at or near the lower end thereof and on the other hand on the cylindrical support, the tube having a portion of decreased internal diameter in the clamping zone and a longitudinal slit in said zone, so that a clamping force exerted by the clamping means can decrease the diameter of the tube in the clamping zone thereby clamping the cylindrical support in place after the desired vertical and/or rotational adjustment of the vise has been made. Owing to the decreased internal diameter of the tube the area of contact between the tube and the cylindrical support is decreased to a minimum and accordingly also the friction between these two parts is diminished so that sticking or canting is virtually prevented.

The danger of such sticking or canting of the cylindrical support within the tube is caused by the fact that the jaws of a vise project in a cantilever manner from the support at the workbench which means that the vertical plane through the jaws is a certain distance from the longitudinal axis of the tube, which distance increases when the jaws are moved apart for accommodating a workpiece. The distance between said plane and axis creates a tilting moment which can be opposed by the gas spring in that it is inclined with respect to the longitudinal axis of the tube in such way that its longitudinal axis intersects said vertical plane below the jaws. It is apparent that by such inclination of the gas spring the tilting moment and also the danger of sticking or canting is greatly reduced. Together with the decreased area of contact between the cylindrical support and the tube the ease of vertical adjustment is safeguarded.

Figure 1:
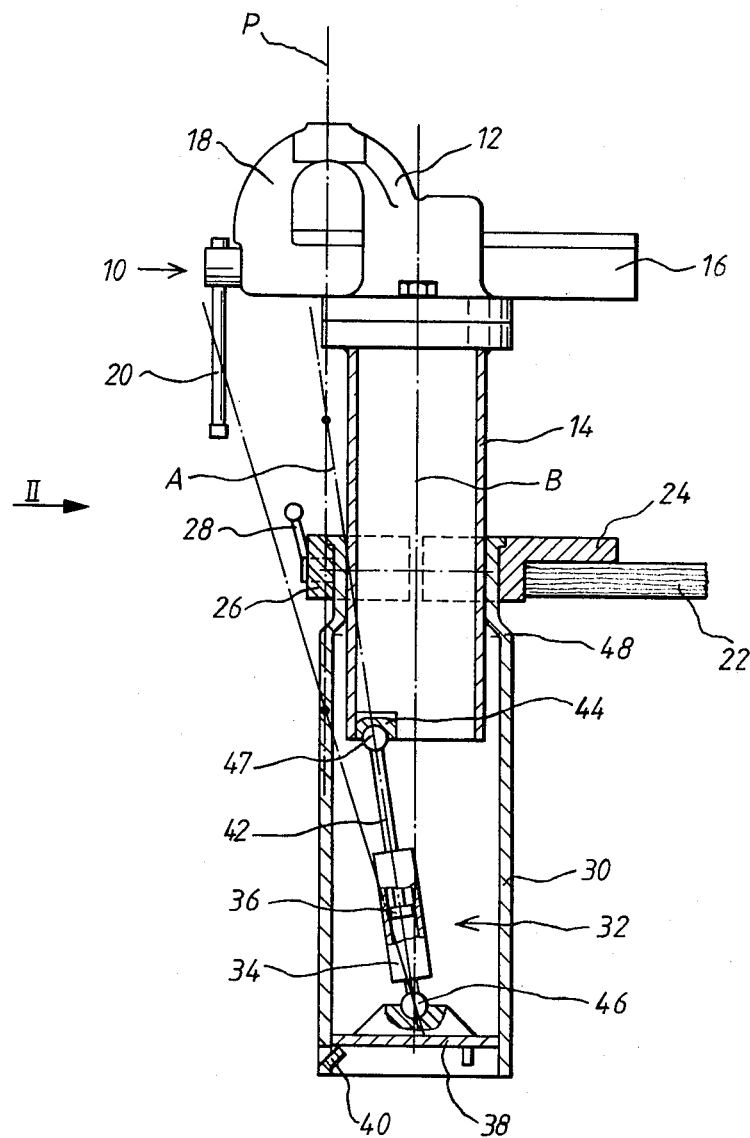
FIG. 1 is a side elevation, partly in section, of a vise according to the invention.
Figure 2:
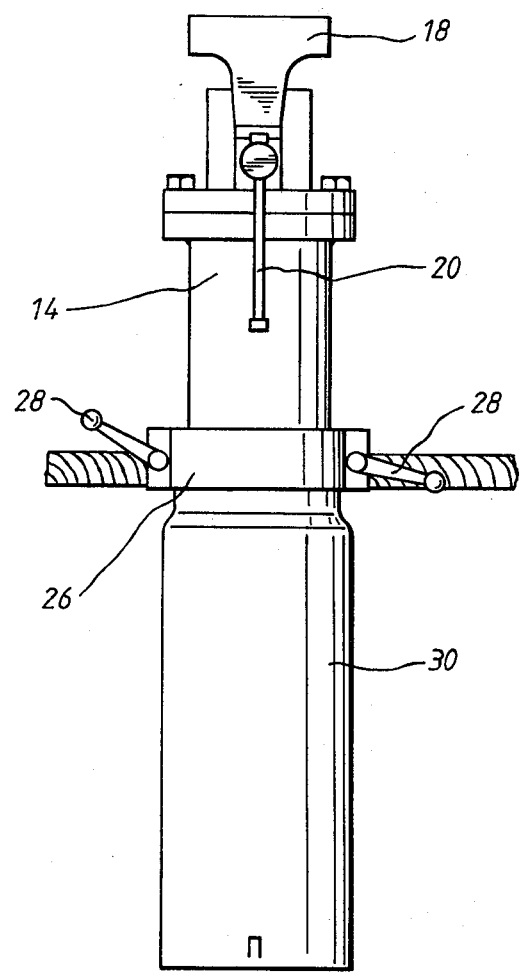
FIG. 2 is a front elevation of the vise shown in FIG. 1.

In the drawings the numeral 10 designates the vise which comprises a fixed jaw 12 to the lower side of which a cylindrical support 14 is secured. A conventional guide 16 extends through the fixed jaw 12 and carries a movable jaw 18. The movable jaw 18 can be advanced towards and away from the fixed jaw 12 by means of a spindle (not shown) which can be turned by a handle 20.

The vise can be attached to a workbench 22 by means of a mounting 24 which is secured to the bench by screws or the like. The mounting 24 comprises a bracket 26 attached thereto by screws and nuts 28. The bracket 26 defines a cylindrical seat for a cylindrical tube 30 which accommodates the cylindrical support 14 of fixed jaw 12. The cylindrical support 14 can be shifted i.e. adjusted in vertical direction, and also be rotated in tube 30 and it can be clamped in place by tightening the nuts 28 in a manner to be described later on.

In order to facilitate the vertical adjustment of the vise 10 a gas spring 32 comprising a cylinder 34 and a piston 36 is arranged between the tube 30 and the cylindrical support 14. To this end the cylinder abuts with its lower end on a cover 38 which is inserted in the lower end of tube 30 and is secured therein by lugs 40 which are pressed inwardly from the wall of tube 30. The upper end of the rod 42 extending from piston 36 cooperates with an abutment 44 attached to the lower end of the cylindrical support 14. As can be seen from FIG. 1 the longitudinal axis A of the gas spring 32 is inclined with respect to the longitudinal axis B of the tube 30 and the cylindrical support 14 towards the jaws 12,16 to such extent that it intersects the vertical plane P through the facing faces of the jaws 12,16 below the jaws. It will be appreciated that owing to the cantilever arrangement of the jaws a tilting moment is created by the weight of the jaws (and the weight of any workpiece clamped between the jaws) and the distance between the axis B and the plane P. This tilting moment tends to clamp the cylindrical support 14 within the tube 30. However, as the gas spring 32 is inclined in the manner described above the force exerted by it counteracts the tilting movement so that the vertical movement of the vise is eased. In view of the fact that the vise is also rotatable about the axis B the support of the gas spring cylinder on the cover 38 is in the shape of a ball joint 46, and likewise also the support of the rod 42 on abutment 44 is in form of a ball joint 47. In this way a free rotation of the vise is enabled.

Figure 3:
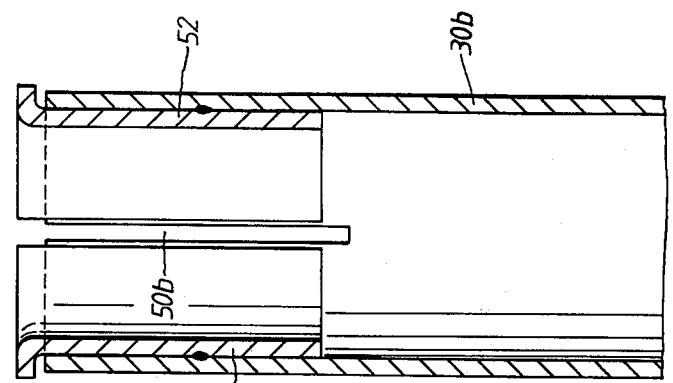
FIG. 3 is a longitudinal sectional view of the tube incorporated in the vise of FIGS. 1 and 2.

It is apparent that the ease of vertical movement or adjustment is dependent on the friction between the tube 30 and the cylindrical support 14. Such friction can be reduced by the described inclination of the gas spring. It can be further reduced by decreasing the contact area between the tube 30 and the cylindrical support. To this end the upper portion 48 of tube 30 is of reduced inner diameter as can best be seen from FIG. 3. In order to enable the cylindrical support 14 to be clamped in place the tube 30 is provided with at least one longitudinal slit 50 having a length at least equal to the length of portion 48. This length may be up to ⅓ of the total length of tube 30. However, even a shorter length gives sufficient guidance to the cylindrical support 14 owing to the fact that the pneumatic spring 32 resists any tilting of the cylindrical support 14.

Figure 4:
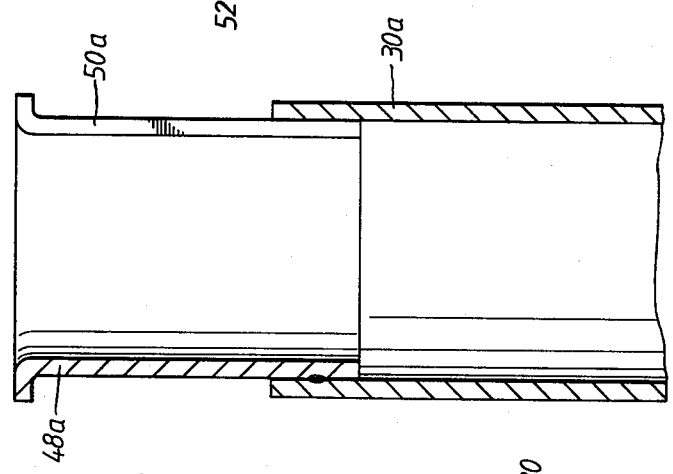
FIG. 4 is a longitudinal sectional view of a modification of the tube shown in FIG. 3.

FIG. 4 shows a modification of the tube 30a, whereby the portion 48a of reduced internal diameter is provided by a separate cylindrical part which has a longitudinal slot 50a and which is inserted in the upper end of tube 30a and secured in place by one or several rivets, by spot welding or the like, the connection being such that the contraction by the clamping device (bracket 26) of the portion 48a is not impeded. The clamping device engages that part of portion 48a which projects from tube 30a.

Figure 5:
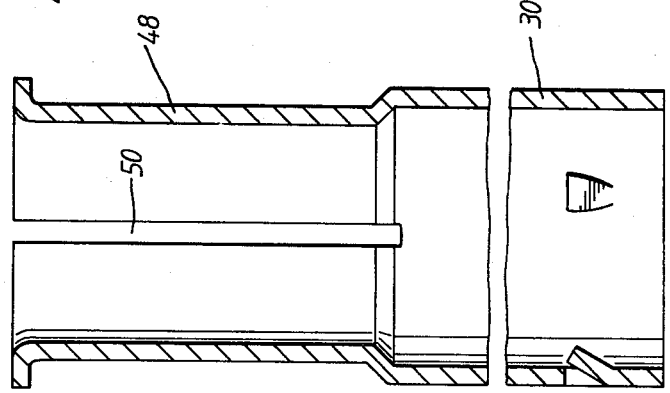
FIG. 5 is a longitudinal sectional view of a further modification of the tube shown in FIG. 3.

In the modification of FIG. 5 the reduced portion at the upper end of tube 30b is realized by two or more part-cylindrical inserts 52 which are riveted or spot-welded to the inner wall of tube 30b. Between the inserts 52 the tube 30b is slotted at 50b so that it can be contracted by the clamping device.

What is claimed is:

1. A vise comprising a fixed jaw and a movable jaw, a cylindrical support secured to the fixed jaw and depending therefrom, a mounting for attaching the vise to a bench, said mounting comprising a clamping device, a tube accommodating said cylindrical support for rotational and vertical adjustment, said tube being supported and engaged by said clamping device whereby tightening of said clamping device clamps said cylindrical support and vise in place, a gas spring within said tube and acting between said tube and said cylindrical support for exerting an upwardly directed force on said cylindrical support, the portion of the tube engaged by the clamping device having a reduced internal diameter and being slotted in longitudinal direction whereby the cylindrical support engages the tube along this portion of reduced internal diameter only, said portion of reduced internal diameter being formed by a slotted cylindrical insert secured to projecting from the upper end of the tube.

2. A vise according to claim 1 wherein the gas spring comprises a cylinder and a piston slidable therein and confining a space containing a pressurized gaseous fluid, one of said cylinder and piston abutting against said tube and the other abutting against said cylindrical support, said gas spring having a longitudinal axis which is inclined with respect to the longitudinal axis of the tube such that it intersects the vertical median plane through the jaws below said jaws in any position of the movable jaw.

3. A vise according to claim 2 wherein the abutment between said cylinder and piston on one hand and said tube and cylindrical support on the other hand is in the form of a ball joint.

4. A vise comprising a fixed jaw and a movable jaw, a cylindrical support secured to the fixed jaw and depending therefrom, a mounting for attaching the vise to a bench, said mounting comprising a clamping device, a cylindrical tube accommodating said cylindrical support for rotational and vertical adjustment, said clamping device engaging said tube along a portion thereof whereby tightening of the clamping device clamps said cylindrical support and vise in place, a gas spring within said tube, said spring comprising a cylinder and a piston slidable therein and confining a space containing a pressurized gaseous fluid, one of said cylinder and piston abutting against said tube and the other abutting against said cylindrical support for exerting an upwardly directed force on said cylindrical support, said gas spring having a longitudinal axis which is inclined with respect to the longitudinal axis of the tube in such way that it intersects the vertical median plane through the jaws below said jaws irrespective of the position of the movable jaw, the portion of the tube engaged by the clamping device having a reduced internal diameter and being slotted in longitudinal direction whereby the cylindrical support engages the tube along this portion of reduced internal diameter only.

5. The vise of claim 4 wherein said portion of reduced internal diameter is formed by a contraction of the tube.

6. The vise of claim 4 wherein the abutment between said cylinder and piston on the one hand and said tube and cylindrical support on the other hand is in the form of a ball joint.

7. A vise comprising a fixed jaw and a movable jaw, a cylindrical support secured to the fixed jaw and depending therefrom, a mounting for attaching the vise to a bench, said mounting comprising a clamping device, a tube accommodating said cylindrical support for rotational and vertical adjustment, said tube being supported and engaged by said clamping device whereby tightening of said clamping device clamps said cylindrical support and vise in place, a gas spring within said tube and acting between said tube and said cylindrical support for exerting an upwardly directed force on said cylindrical support, the portion of the tube engaged by the clamping device having a reduced internal diameter and being slotted in longitudinal direction whereby the cylindrical support engages the tube along this portion of reduced internal diameter only, said portion of reduced internal diameter being formed by part-cylindrical inserts attached to the inner wall of said tube near the upper end thereof, the tube being slotted in longitudinal direction between said inserts.

* * * * *